United States Patent [19]

Andreola et al.

[11] Patent Number: 5,173,530
[45] Date of Patent: Dec. 22, 1992

[54] STABLE DISPERSIONS OF POLYOLS CONTAINING POLYVINYLCHLORIDE

[75] Inventors: Piero Andreola, Venezia; Sauro Gaiba, Mestre-Venezia; Eugenio Bianchin, Treviso; Carlo Mulas, Mogliano Veneto, all of Italy

[73] Assignee: Montedipe S.p.A., Italy

[21] Appl. No.: 707,316

[22] Filed: May 30, 1991

Related U.S. Application Data

[63] Continuation of Ser. No. 489,866, Mar. 5, 1990, abandoned, which is a continuation of Ser. No. 193,599, May 13, 1988, abandoned.

[30] Foreign Application Priority Data

May 15, 1987 [IT] Italy .................. 41005 A/87

[51] Int. Cl.⁵ .................. C08K 5/17; C08K 5/10; C08K 5/06
[52] U.S. Cl. .................. 524/377; 524/220; 524/243; 524/245; 524/291; 524/310; 525/131
[58] Field of Search ............... 524/366, 220, 376, 377, 524/378, 291, 243, 244, 245, 308, 310, 567, 569

[56] References Cited

U.S. PATENT DOCUMENTS

| | | | |
|---|---|---|---|
| 3,157,964 | 11/1964 | Ferguson | 524/377 |
| 4,751,118 | 6/1988 | Wypart | 428/35 |
| 4,851,464 | 7/1989 | Wozniak | 524/230 |

FOREIGN PATENT DOCUMENTS

| | | |
|---|---|---|
| 3856 | 1/1982 | Japan . |
| 65766 | 4/1982 | Japan . |
| 291929 | 1/1971 | U.S.S.R. . |
| 587880 | 5/1947 | United Kingdom . |
| 1040452 | 8/1966 | United Kingdom . |

*Primary Examiner*—Christopher Henderson
*Attorney, Agent, or Firm*—Morgan & Finnegan

[57] ABSTRACT

Stable dispersions of polyols having a viscosity lower than 10,000 mPa×sec and containing dispersed particles of polyvinylchloride, having a size within the range of from 1 to 10 micrometers and impregnated by the said polyols.

17 Claims, No Drawings

STABLE DISPERSIONS OF POLYOLS CONTAINING POLYVINYLCHLORIDE

This application is a continuation application of Ser. No. 07/489,866, filed Mar. 5, 1990, which in turn is a continuation application of Ser. No. 07/193,599, filed May 13, 1988, each of which is abandoned.

FIELF OF THE INVENTION

The present invention relates to stable dispersions of polyols containing polyvinylchloride and to the process for producing them.

More particularly, the present invention relates to stable dispersions of polyols containing polyvinylchloride, which are particularly suitable for use in producing elastomeric polyurethanes and/or rigid or flexible polyurethane foams.

BACKGROUND OF THE INVENTION

It is well known that elastomeric polyurethanes and polyurethane foams are produced by means of a polyaddition process, by reacting a polyol with an organic polyisocyanate, usually in the presence of blowing agents, activating agents such as tertiary amines and/or organometallic compounds, emulsifiers, and so forth.

It is also well known that in order to improve the physical characteristics of polyurethanes, such as their ageing resistance, their elastic modulus, and the dependence of this latter on temperature, a technique known from the prior art consists in dispersing polymer particles through the polymeric matrix. In general, the polymer particles are dispersed into the polyol before it is reacted with the polyisocyanate.

British patent No. 1,040,452 teaches the preparation of the polymer/polyol dispersion by polymerizing the ethylenically unsaturated monomer, from which originates the polymer, directly within the polyol. For that purpose, the ethylenically unsaturated monomer is dissolved or dispersed into the polyol in an amount within the range of from 1 to 60% by weight, and then subsequently polymerized while it is mixed with the polyol.

The polymerization is carried out in the presence of the usual initiators, which can be peroxides, such as lauryl-peroxide, benzoyl-peroxide, di-cumyl-peroxide, and so forth; the nitrogen-containing initiators, such as azo-bis-isobutyronitrile; the redox systems; high-energy radiation, and so forth.

According to said British patent No. 1,040,452, any ethylenically unsaturated monomer containing one or more double bond(s) can be used for producing the polymer particles.

Examples of such monomers are: styrene and vinyl aromatic monomers in general, olefinic or di-olefinic hydrocarbons, such as ethylene, propylene, 1-butylene, 2-hexene, 1,3-butadiene, 2-pentene, etc.; vinyl esters, such as vinyl acetate or in propionate,; vinyl halides, such as vinyl chloride, vinylidene chloride, etc.; acrylic acid, methacrylic acid and their esters or nitriles such as methacrylates, acrylates, acrylonitrile and so forth.

These monomers may be used alone or mixed with each other.

When polyurethanes filled with polymers are prepared starting from a polyol wherein the polymer is dispersed, one of the necessary conditions is that the polymer particles which are formed be homogeneously and stably dispersed throughout the polyol, as to form an "organosol".

Another necessary condition for preparing polymer-filled polyurethanes, useful for the required applications, is that the polyol containing the dispersed polymer have a not too high viscosity, e.g., not higher than 10,000 mnPa×sec., so that it can be easily treated with the organic polyisocyanate, both as such or as an isocyanate-polyol prepolymer, in the usual equipment and by means of the usual techniques as usually employed for obtaining polymeric particles homogeneously dispersed throughout the mass.

The processes known from the prior art for obtaining the homogeneous dispersions of the polymer into the polyol by means of an "in situ" polymerization, allowed one to obtain satisfactory results as to the processability and the physical properties of the obtained product, in the case of some ethylenically unsaturated monomers. In particular, best results are obtained with acrylonitrile, the dispersions of which are homogeneous and stable over time. On the contrary, in the case of vinyl chloride, the obtained dispersions do not show such favorable properties; in fact, owing to the morphology of the particles, the dispersions have a creamy consistency, or contain lumps, so that filtering is necessary before they are treated with the organic polyisocyanate.

From Italian Patent No. 1,152,478 homogeneous and stable dispersions of polyvinylchloride in polyolpolyether are known, obtained by polymerizing vinyl chloride in the liquid phase, and up to a conversion not higher than 40%, without stirring, or with a mild stirring, in the presence of an organic compound which acts as a solvent for monomeric vinyl chloride and as a precipitating agent for polyvinylchloride, and of a polyol having a molecular weight not higher than 10,000.

However, this process also has drawbacks, mainly due to the need of recovering the excess of unreacted monomer which is known to cause not only economic but also safety problem, due to the possible formation of unstable peroxides.

Stable dispersions of one or more thermoplastic polymer(s) or copolymer(s) such as polyvinylchloride in polyols are disclosed in French patent No. 2,284,638. According to this patent, stable dispersions are prepared by homogeneously blending the polyol, having a hydroxyl index within the range of from 10 to 1,000, with a latex of the thermoplastic polymer or copolymer having a particle size within the range of from 0.02 to 0.8 micrometers. After homogenizing the blend, the water supplied by latex is evaporated under vacuum at a temperature lower than 110° C. The major drawback of the dispersions obtained by means of this process is that they are unstable in the formulations generally used for preparing polyurethanes. In fact, it was observed that the particles of polyvinylchloride separate from the dispersion and form lumps which cause drawbacks in the subsequent polyurethane processing.

DETAILED DESCRIPTION OF THE INVENTION

It has, surprisingly, now been found that by using particles of preformed polyvinylchloride, having a size within the range of from 1 to 10 micrometers and soaked with the same polyol inside which they are dispersed, homogeneous dispersions, stable over time, of polyvinylchloride dispersed into polyol may be obtained which do not show the hereinabove drawbacks.

Therefore, the present invention provides stable dispersions of polyols containing from 1 to 50% by weight of preformed polyvinylchloride in particulate form and having a viscosity lower than 10,000 mPa×sec., wherein said particles have a size within the range of from 1 to 10 micrometers and are soaked with the same polyol as used for preparing the dispersion. Polyvinylchloride amounts within the range of from 5 to 30% by weight are preferred.

The polyols which can be used in the preparation of the dispersions of the present invention are well-known per se, and are available on the market.

As an example of polyols, one may cite polyol-polyethers, polyol-polyethers containing ester groups, polyol-polyethers containing amino groups, polyol-polyethers containing end amino groups, polyol-polyesters, etc.

The polyol-polyethers suitable for producing the dispersions of the present invention are those which have the formula:

$$HO\text{---}(R\text{---}O)_n\text{---}H \quad (I)$$

wherein:
R is a divalent alkylene radical containing from 2 to 4 carbon atoms, and
n is an integer within the range of from 2 to such a number as to yield a molecular weight of up to 10,000.

Some of the R radicals may be either tri- or polyvalent, so that branched polyol-polyethers will be obtained.

Such polyol-polyethers, which generally have a viscosity within the range of from 200 to 5,000 mPa×sec. are obtained by means of the ether condensation of cyclic oxides, and may be either straight-chain or branched. In practice, polyol-polyethers from ethylene oxide and propylene oxide are preferred.

Furthermore, the polyol-polyethers may be obtained from a single cyclic oxide, or from different cyclic oxides, so as to form a copolymer.

Also polyol-polyethers containing ester groups may be used in the dispersions of the present invention. Such polyol-polyethers are obtained from the above polyol-polyethers by replacing, to a limited extent, and for not more than 15 monomeric units %, the structural units coming from cyclic oxides, or by structural units coming from aliphatic or aromatic di- or monocarboxy acids.

Polyol-polyethers containing ester groups correspond to formula (I) wherein some of the monomeric units —R—O are replaced by repeated units:

$$O\text{---}R\text{---}OOC\text{---}R'\text{---}COO\text{---}R\text{---}O\text{---} \quad (II)$$

wherein R' is an aliphatic or aromatic divalent radical containing from 1 to 18 carbon atoms.

In the preparation of the dispersions of the present invention, polyethers containing amino groups may also be used. Said amino-group-containing polyethers are the adducts of alkylene oxide with mono- or polyamines, and are preferably obtained by reacting alkylene oxides containing from 2 to 4 carbon atoms with a mono- or poly-amine such as methyl-amine, ethyl-amine, isopropyl-amine, ethylene-diamine, di-ethylene triamine, butene-diamine, aniline, phenylene-diamine, toluylene-diamine, naphthalene-diamine, aniline/formaldehyde condensation products, and so forth.

Among the polyol-polyesters, those may be mentioned which result from the condensation of polycarboxylic acids with polyvalent alcohols. Any suitable polycarboxylic acids may be used, such as, e.g., oxalic acid, malonic acid, succinic acid, glutaric acid, adipic acid, pimelic acid, suberic acid, azelaic acid, sebacic acid, maleic acid, fumaric acid, glutaconic acid, isophthalic acid, terephthalic acid, hemimellitic acid, 1,4-cyclohexane-dicarboxylic acid, and their derivatives.

As the polyvalent alcohol, both aliphatic and aromatic alcohols, such as e.g., ethylene glycol; 1,3-propylene glycol; 1,2-propylene glycol; 1,4-butylene glycol; 1,3-butylene glycol; 1,2-butylene glycol; 1,5-pentane-diol; 1,6-hexane-diol; glycerol; 1,1,1-trimethylopropane; 1,1,1-trimethylol-hexane; 1,2,6-triol-hexane; pentaerythritol; and sorbitol, may be used. The term "polyvalent alcohols" also includes compounds coming from phenol, such as bisphenol A.

Among polyesters, caprolactones and caprolactones modified by copolymerization with an alkylene oxide may be mentioned.

The term "polyvinylchloride", as used in the present disclosure and in the appended claims, encompasses both vinyl chloride homopolymer, and those co-polymers which contain at least 50% by weight of vinyl chloride, the balance being an ethylenically unsaturated monomer copolymerizable with vinyl chloride.

By the term "ethylenically unsaturated monomer", organic compounds containing the C=C group are meant.

Examples of such compounds are: vinyl and vinylidene compounds, such as vinylidene fluoride and chloride, vinyl fluoride, vinyl esters of aliphatic carboxylic acids containing from 2 to 18 carbon atoms such as, e.g., the vinyl esters of acetic acid, propionic acid and so forth, acrylic monomers, such as acrylic acid, methacrylic acid and their derivatives, such as acrylonitrile, acrylates and methacrylates of aliphatic alcohols containing from 1 to 12 carbon atoms, allylic compounds such as allyl acetate, allyl chloride, allylethyl ether, and so forth.

Polyvinylchloride may be obtained according to any known type of polymerization technique, such as, e.g., in emulsion, in suspension, or in bulk.

Polyvinylchloride produced according to the emulsion polymerizastion process, and having particle size or size of the agglomerates thereof, smaller than 50 micrometers, is preferred in the preparation of the dispersions of the present invention.

For preparing the dispersions of the present invention, any process may be used, which allows the particles of polyvinvychloride to be milled down to size from 1 to 10 micrometers, and to be soaked with polyol. In particular, all the processes known from the prior art which allow the milling operation to be carried out without an excessive increase in temperature, which would lead to the formation of high viscosity organosols, are preferred.

A preferred process for preparing the dispersions of the present invention consists in dispersing polyvinylchloride into the polyol by mechanical stirring. The thus-obtained dispersion is sent to a milling machine, which may be a roll milling machine, or a gear mill, a colloid mill, or a microsphere mill, such as generally used for preparing inks, toothpastes, master-batches, and so forth.

In order to maintain the temperature during the process at a value not higher than 50° C., the equipment is preferably surrounded by a jacket through which a coolant is circulated.

The residence time of the dispersion inside the milling machine is generally of the order of from 0.1 to 10 minutes, and may vary according to the desired particle size and soaking degree.

As an alternative, the components of the dispersion may be separately fed to the milling machine, or to the microsphere mill.

In order still better to illustrate the underlying inventive concept and in order to enable one to reduce it to practice, the following non-limitative examples are given.

In these examples, the stability over time of the polyol-polyvinylchloride dispersion is measured by determining the residue after centrifugation. For this purpose, 40 g of product are loaded into a 100×45 mm test tube and centrifuged for 30 minutes at 6,500 rpm. After said time, the upper portion of the dispersion is removed by tilting the test tube, until the residue has a constant weight. The residue is weighted and expressed as a percentage by weight of the starting product. The lower the residue percentage, the higher the stability of the dispersion.

The following examples are not considered limiting.

EXAMPLE 1

Into a mixer of 200-liters, equipped with a propeller stirrer, there were loaded:
- 20 kg of polyvinylchloride, obtained by emulsion polymerization, having a molecular weight of 50,000, and the following characteristics:
  number average particle size = 3.79 micrometers;
  volumetric average diameter = 5.7 micrometers;
  ratio of the volumetric average diameter to surface area = 9.35; and
- 80 kg of polyol-polyether obtained by condensing ethylene oxide and propylene oxide in a 1:4 weight ratio, having a molecular weight of 5,000 and a hydroxyl number of 32 mg KOH/g.

The mixture was stirred at 100 rpm for 15 minutes.

The thus-obtained mixture was fed to a Z21 milling machine (made by MOLTENI—Milan (Italy)), provided with 400×180 cm rollers.

The mechanical blend was fed to the milling machine at a flow rate of 7 kg/hour, a pressure of 70 kg/cm² being maintained between the rollers.

The blend was processed by three successive passes through the same milling machine and under the same conditions.

100 kg were obtained of a homogeneous organosol of polyvinylchloride in polyol-polyether, with a polyvinylchloride content of 20% by weight, having a viscosity of 1,900 mPa×sec at 25° C. The particles of polyvinylchloride were homogeneously dispersed, had a spheroidal shape, and had an average size of 5 micrometers.

The stability of the dispersion, when determined as residue percent on centrifugation, was 6%.

The time during which 1% of the polyvinylchloride precipitates was 180 days.

(COMPARATIVE) EXAMPLE 2

The mixture of Example 1 was prepared by simple mixing at 100 rpm for 15 minutes.

The obtained mixture had a viscosity of 3,500 mPa× sec at 25° C. and showed a stability, determined as the percentage of residue on centrifugation, of 21%. The average size of the polyvinylchloride was 30 micrometers.

The time for 1% polyvinylchloride to precipitate was 10 days.

EXAMPLE 3

The following formulation was prepared for the production of a polyurethane flexible foam by cold molding:
- polyvinylchloride-containing polyol-polyether: 125 parts by weight
- silicone surfactant TEGO B 4113 by TR. Goldschmidt AG: 0.5 parts by weight
- water: 3 parts by weight
- crosslinking agent (triethanolamine): 0.5 parts by weight
- Algofrene 11 (trichloromonofluoro-methane): 11 parts by weight
- aminic catalysts
- Niax C174 by UNION CARBIDE: 0.5 parts by weight
- Dabco 33 LV (33% dipropyleneglycol) by AIR PRODUCTS: 1.1 parts by weight The formulated material, after resting for 170 days, did not show any precipitate.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. Homogenous, stable dispersions of polyol selected from the group consisting of polyol-polyethers containing ester groups, polyol-polyethers containing amino groups, polyol-polyethers containing end amino groups, and polyol-polyesters comprising from 1 to 50% by weight of polyvinylchloride and having a viscosity less than 10,000 mPa×sec wherein
   a) the polyvinylchloride is previously polymerized;
   b) the polyvinylchloride comprises particles having size within the range of from 1 to 10 micrometers; and
   c) the polyvinylchloride particles are soaked by the same polyol;
whereby soaking of the polyvinylchloride particles as well as size reduction thereof being realized by dispersing polyvinylchloride into the polyol through mechanical stirring and then milling the thus obtained dispersion in a milling machine.

2. Dispersions according to claim 1, wherein the amount of polyvinylchloride is within the range of from 5 to 30% by weight.

3. Dispersions according to claim 1, wherein polyvinylchloride is a homopolymer of vinyl chloride or a copolymer containing at least 50% by weight of vinyl chloride, the balance being an ethylenically unsaturated monomer copolymerizable with vinyl chloride.

4. Dispersions according to claim 3, wherein the polyvinylchloride is obtained by emulsion polymerization and is in the form of particles, or of agglomerates thereof, having a size smaller than 50 micrometers.

5. Dispersions according to claim 1, wherein the milling machine is a roll milling machine, a colloid mill, a gear mill or a microsphere mill.

6. Dispersions according to claim 1, wherein the milling process is carried out at a temperature lower than 50° C.

7. Dispersions according to claim 1, wherein residence time of the dispersion in the milling machine is within the range of from 0.1 to 10 minutes.

8. Dispersions according to claim 1, wherein the polyol-polyether containing ester groups contains repeated units:

$$O-R-OOC-R'-COO-R-O \qquad (II)$$

wherein R is a divalent alkylene radical containing from 2 to 4 carbon atoms, and R' is a divalent aliphatic or aromatic radical containing from 1 to 18 carbon atoms.

9. Dispersion according to claim 1, wherein the polyol-polyether containing amino groups is obtained by reacting an alkylene-oxide containing from 2 to 4 carbon atoms with a mono- or poly-amine.

10. Dispersions according to claim 1, wherein the polyol-polyester is obtained by reacting a polycarboxylic acid with a polyvalent alcohol.

11. Homogeneous, stable dispersions of a polymer in a polyol, consisting of from 1 to 50% by weight of polyvinylchloride particles and having a viscosity lower than 10,000 mPa×sec, obtained from a polyvinylchloride coming from a previous polymerization, wherein the polyvinylchloride particles in the already prepared dispersions, ready for use, are impregnated by the polyol and have a size from 1 to 10 micrometers, the polyol being a polyether-polyol having formula:

$$HO-(R-O)_n-H \qquad (I)$$

wherein R is a divalent alkylene radical, containing from 2 to 4 C atoms, and n is an integer from 2 to such a number as to yield a molecular weight of up to 10,000.

12. Dispersions according to claim 11, wherein the amount of polyvinylchloride is within the range of from 5 to 30% by weight.

13. Dispersions according to claim 11, wherein the polyol-polyether has a viscosity within the range of from 200 to 5,000 mPa×sec.

14. Dispersions according to claim 11, wherein the polyvinylchloride is a homopolymer of vinyl chloride, or a copolymer containing at least 50% by weight of vinyl chloride, the balance being an ethylenically unsaturated monomer copolymerizable with vinyl chloride.

15. Dispersions according to claim 11, wherein polyvinylchloride is previously prepared by emulsion polymerization.

16. Dispersion according to claim 1, wherein the polyol-polyether containing amino groups is obtained by reacting an alkylene-oxide containing from 2 to 4 carbon atoms with a mono- or poly-amine.

17. Dispersions according to claim 1, wherein the polyol-polyether contains end amino groups.

* * * * *